United States Patent [19]

Shiraishi et al.

[11] Patent Number: 4,805,155
[45] Date of Patent: Feb. 14, 1989

[54] SPEED CONTROL CIRCUIT FOR MECHANICAL SCAN ULTRASONIC IMAGING APPARATUS

[75] Inventors: Masaaki Shiraishi, Yokohama; Masaaki Ichiki; Kazuhiko Shibata, both of Kawasaki, all of Japan

[73] Assignee: Matsushita Electric Industrial Co., Ltd., Japan

[21] Appl. No.: 943,143

[22] Filed: Dec. 15, 1986

[30] Foreign Application Priority Data

Dec. 16, 1985 [JP] Japan ................................ 60-283344
Nov. 10, 1986 [JP] Japan ................................ 61-266897

[51] Int. Cl.$^4$ .............................................. G03B 42/06
[52] U.S. Cl. ......................................... 367/7; 367/104; 128/660.1; 73/625
[58] Field of Search ................... 367/7, 103, 104, 105, 367/83, 95; 128/660, 661; 73/625, 626, 618

[56] References Cited

U.S. PATENT DOCUMENTS

| | | | |
|---|---|---|---|
| 3,895,340 | 7/1975 | Gilmour | 367/103 |
| 3,986,089 | 10/1976 | Sword et al. | |
| 4,149,419 | 4/1979 | Connell, Jr. et al. | |
| 4,151,834 | 5/1979 | Sato et al. | |
| 4,296,446 | 10/1981 | Zorbalas | |
| 4,381,787 | 5/1983 | Hottinger | 73/620 |

FOREIGN PATENT DOCUMENTS 1564375 4/1980 United Kingdom .
2097534 11/1982 United Kingdom .

OTHER PUBLICATIONS

ULTRASONICS, vol. 16, No. 4, Jul. 1978, pp. 171-178, IPC Business Press Ltd, Guildford, GB; T. Matzuk et al.: "Novel Ultronsonic Realtime Scanner Featuring Servo Controlled Transducers Displaying a Sector Image", pp. 171-176 Equipment description.
IEEE Transactions on Industry Applications, vol. IA-15, No. 2, Mar./Apr. 1979, pp. 183-188; Hoang Le-Huy: "A Synchronous Thyristorized DC Motor Drive", pp. 183, 184, abstract and first 3 paragraphs.
IBM Technical Disclosure Bulletin, vol. 18, No. 11, Apr. 1976, pp. 3652-3653, New York, US; Y. E. Chang et al.: "High Resolution Digitally Programmable Period Synthesizer", Whole article.
EDN, vol. 25, No. 18, 5th Oct. 1980, pp. 125-128, Cahners Publishing Co., Division of Reed Holdings, Inc., Boston, US; A. D. Delagrande: "Need a Precise Tone TM Synthesize Your Own", Whole article.

Primary Examiner—Thomas H. Tarcza
Assistant Examiner—Daniel T. Pihulic
Attorney, Agent, or Firm—Lowe, Price, Leblanc, Becker & Shur

[57] ABSTRACT

In an ultrasonic imaging apparatus of the type having a plurality of selectable modes of operation, a motor-driven electroacoustic transducer is steered in a sector field in a predetermined relation to a selected operational mode. The sector scan format of returning echos is converted to a line-by-line raster display format in response to line sync pulses. The number of line sync pulses generated per unit time interval is scaled by a factor of N/M, so that it corresponds to the number of pulses generated by the encoder during the same time interval, where N and M are integers which are variable as a function of the selected mode. Phase comparison is made between the pulses generated by the encoder and the scaled line sync pulses to generate a phase difference signal from which a speed control signal is derived for controlling the speed of the motor. Since phase comparison is made for all the pulses generated by the encoder, the resolution of motor speed control is increased with respect to the number of energy transmissions, eliminating blurred or distorted tomographic images.

8 Claims, 2 Drawing Sheets

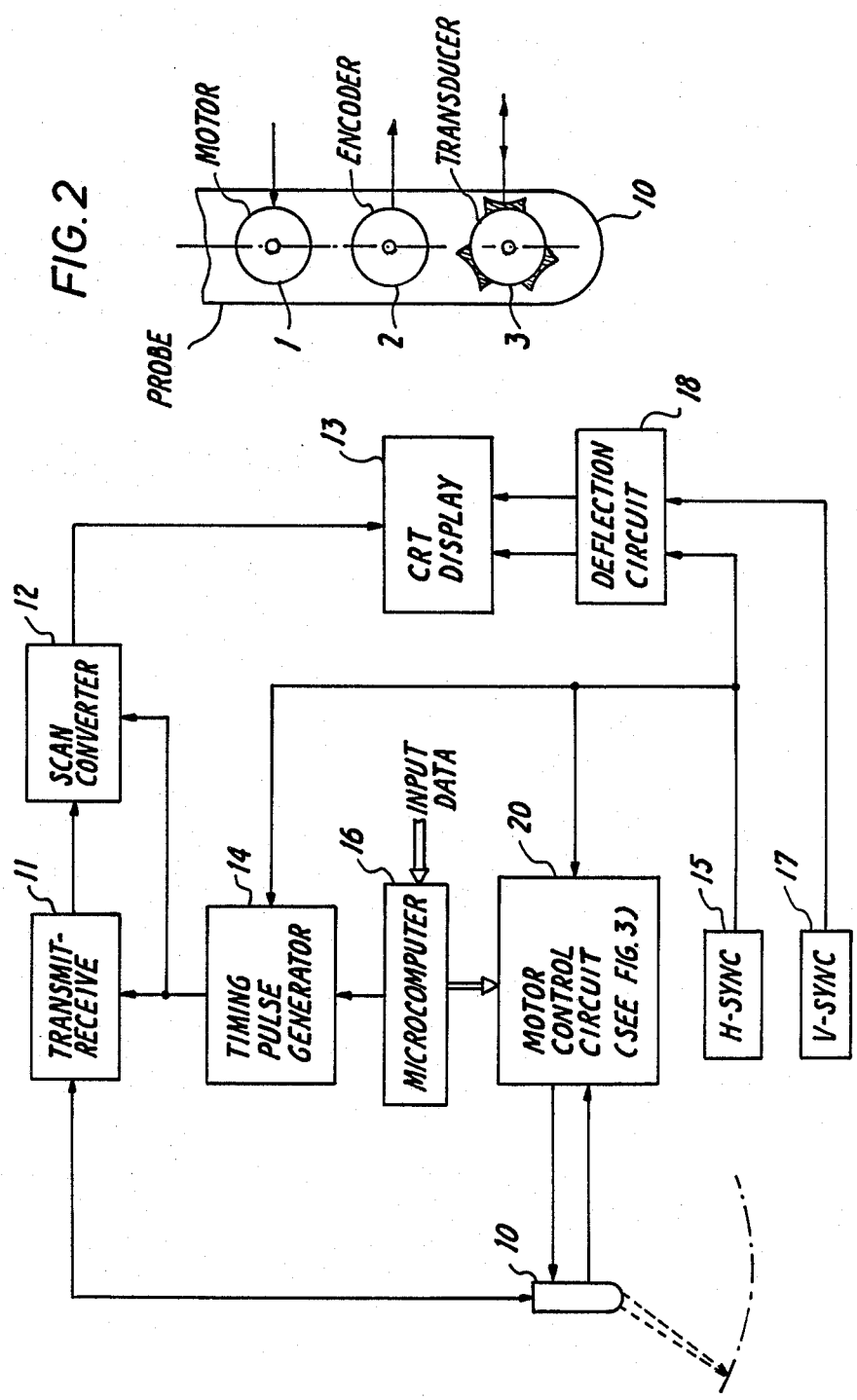

SPEED CONTROL CIRCUIT FOR MECHANICAL SCAN ULTRASONIC IMAGING APPARATUS

BACKGROUND OF THE INVENTION

The present invention relates to ultrasonic imaging, and more specifically to a mechanical sector scan ultrasonic imaging apparatus.

A known mechanical sector scan ultrasonic imaging apparatus has a hand-held probe which is constructed of a rotatably mounted electroacoustic transducer driven by a motor and an ecoder for generating pulses at a frequency variable as a function of the speed of rotation of the transducer. A typical example of the transducer comprises three piezoelectric elements mounted 120 degrees apart on the circumference of a disc driven by the motor. The transducer elements are sequentially connected to a transmit-receive unit for transmission of a beam of acoustic burst energies over a sector field and reception of acoustic echos returning from acoustic discontinuities in the sector field. A scan converter transforms the sector scan format of the received echo signals into a line-by-line rectangular scan format to enable the signals to be displayed on a video screen of a display unit. The speed of rotation of the motor is basically determined in relation to the horizontal line interval of the raster scan so that a predetermined number of horizontal scans occurs during each revolution of the motor for a particular mode of operation. The interval between successive transmissions is also determined in relation to the operational mode so that it is an integral multiple of the horizontal scan interval. To precisely maintain the motor speed in relation to the number of scan lines and hence to the transmission interval for a given mode of operation, the horizontal sync pulses of the raster scan and the encoder pulses are scaled in number with different dividing factors so that the pulses of each signal generated during a unit time coincide in number with those of the other. Phase comparison is made between the two signals to produce a speed correction signal which is summed with the signal that basically determines the motor speed.

Since the number of pulse-to-pulse phase comparisons is reduced with respect to the number of acoustic bursts generated for each revolution of the transducer, the speed correction signal has not sufficient degree of resolution for the speed of rotation of the transducer. The conventional imaging apparatus thus suffers from erratic speed variations which result in blurred or distorted images on the display screen.

SUMMARY OF THE INVENTION

It is therefore an object of the present invention to provide a mechanical scan ultrasonic imaging apparatus which ensures high quality reproduction of tomographic images.

Specifically, the ultrasonic imaging apparatus of the present invention is of the type which operates in one of a plurality of selectable modes. The apparatus includes a probe having a rotatably mounted electroacoustic transducer for transmission of an acoustic beam and reception of acoustic echos, a motor for driving the transducer to cause the beam to be steered in a sector field and an encoder for generating pulses at intervals variable as a function of the speed of rotation of the transducer. A transmit-receive circuit responds to line sync pulses by supplying ultrasonic bursts to the transducer and receiving acoustic echos returning from the scanned sector field, the received echos being displayed on a line-by-line raster scan field. The number of line sync pulses generated during a predetermined period of time is scaled by a factor of N/M, so that it equals the number of pulses generated by the encoder during the same period of time, where N and M are integers which are variable as a function of the selected mode. A phase comparator is provided for making phase comparison between the pulses generated by the encoder and the scaled line sync pulses to generate a phase difference signal from which a speed control signal is derived for controlling the speed of the motor. Since phase comparison is made for all the pulses generated by the encoder, the speed of the motor is controlled precisely in relation to the transmission of acoustic burst energies.

BRIEF DESCRIPTION OF THE DRAWINGS

The present invention will be described in further detail with reference to the accompanying drawings, in which:

FIG. 1 is a block diagram of a mechanical scan ultrasonic imaging apparatus embodying the invention;

FIG. 2 is a view of the ultrasonic probe of FIG. 1; and

DETAILED DESCRIPTION

Figure 3:
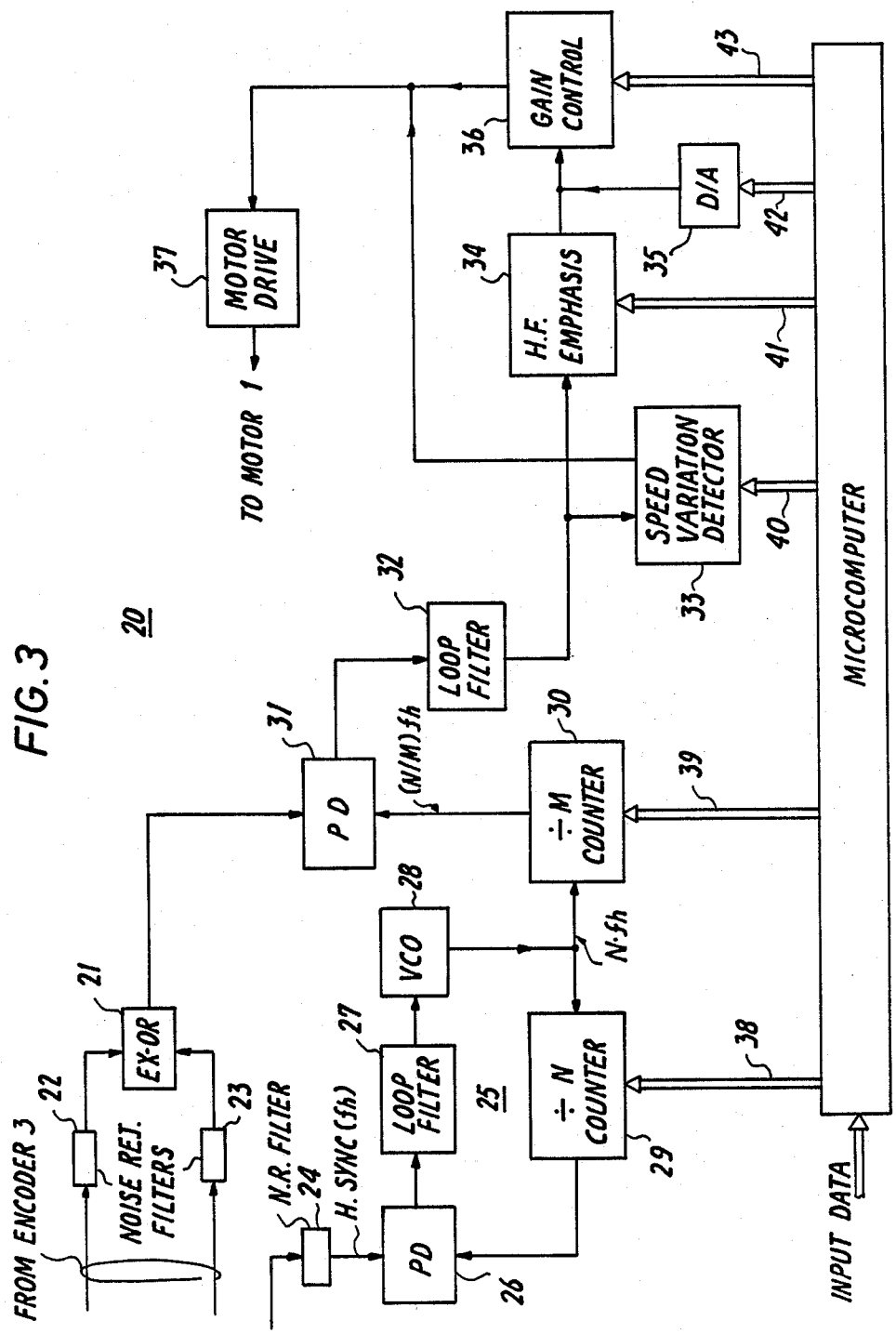
FIG. 3 is a block diagram of the motor speed control circuit of FIG. 1.

A sector scan ultrasonic imaging apparatus embodying the present invention is illustrated in FIG. 1. A beam of ultrasonic burst energy is emitted by a hand-held sector-scan ultrasound probe 10 of a known design. As shown in FIG. 2, probe 10 comprises a motor 1, an encoder 2 and a transducer 3. Transducer 3 includes a set of three piezoelectric elements which are spaced at 120 degrees apart on the circumference of a disc which is rotatably driven by the motor 1. Encoder 2 is rotatably coupled with the transducer to generate for each revolution of the transducer 3 a pair of squarewave signals with the pulses of each signal being displaced 90 degrees with respect to those of the other pulse signal. The number of pulses generated per unit period of time is determined by a selected operating mode of the apparatus. To establish acoustic impedance match between the human skin and the transducer 3, the latter is preferably immersed in a particular liquid.

Probe 10 includes means, not shown, for sequentially connecting the piezoelectric elements of transducer 3 to a transmit-receive unit 11 for enabling ultrasonic energy to be emitted at periodic intervals which are variable corresponding to the selected operating mode. Between successive transmissions, the transducer 3 is rotated by a small angular increment so that the beam is steered to the next path in a sector scan field to enable transmit-receive unit 11 to receive returning ultrasonic echos. The received signal is applied to a scan converter 12 where the sector scan format is converted to a rectangular raster scan format to enable the echos to be displayed in a television raster field on the monitor screen of a cathode-ray tube display 13.

The timing for the transmission and reception of the acoustic energies and the timing for the conversion of scan format are governed by a timing pulse generator 14 which derives the necessary timing pulses from a horizontal sync pulse generator 15 in response to a mode selection signal supplied from a microcomputer 16 for specific diagnostic purposes. Specifically, the apparatus is switched between transmission and reception at intervals which are an integral multiple of the horizontal scan interval, the integral multiple being a function of the selected mode of the apparatus. A vertical sync generator 17 supplies vertical sync pulses to a conventional deflection circuit 18 to which the horizontal sync pulse is also applied. Vertical and horizontal deflection currents are supplied from the deflection circuit 18 to the display 13 to effect the rectangular raster scanning of the cathode-ray beam.

A motor control circuit 20 generates a speed control signal in response to command signals from the microcomputer 16 so that it corresponds to the selected mode of operation. More specifically, the probe motor 1 is rotated at a speed variable in such a range that the number of horizontal scan lines for each revolution of the transducer 3 varies in a range from 900 to 3,900. The intervals between successive bursts of ultrasonic energy are varied with different speeds of rotation of the transducer 3. For example, at the highest speed of transducer rotation, the interval between successive transmissions corresponds to the period of two horizontal line scans and at the lowest speed the interval corresponds to the period of five horizontal line scans. The frequency of the ultrasonic energy is also varied corresponding to the selected mode. Typically, for each revolution of the transducer 3 operating at an intermediate speed, horizontal sync generator 15 produces 1,560 horizontal sync pulses and encoder 2 produces a pair of pulse signals each containing 300 speed related pulses. To enable phase comparison to be made between each of the angular position pulses and the reference phase of the horizontal sync pulse under all the operating modes of the apparatus, motor control circuit 20 is responsive to scaling factor command signals from the microcomputer 16 in a manner as will be described in detail below.

Referring to FIG. 3, the motor control circuit 20 comprises a frequency doubler or Exclusive-OR gate 21. The squarewave pulse signals from the encoder 2 are passed through noise rejection filters 22 and 23, respectively, to the Exclusive-OR gate 21 to cause it to generate output pulses at twice the frequency of each input. The output of Exclusive-OR gate 21 is supplied to a first input of a phase detector 31. The horizontal sync pulse is applied through a noise rejection filter 24 to a phase-locked loop frequency multiplier 25 which is formed by a phase detector 26, a loop filter 27, a voltage-controlled oscillator 28 and a divide-by-N counter 29 (where N is an integer representing a scaling factor). The noise-rejected horizontal sync pulse at frequency "fh" is applied to one input of the phase detector 26 for making phase comparison with the output of the divide-by-N counter 29 to produce a signal representing a phase difference between the two signals. Having passed through the loop filter 27, the phase difference signal controls the frequency of the VCO 28 which in turn increments the counter 29. The scaling factor N of counter 29 is controlled in response to a command signal supplied on bus 38 from the microcomputer 16 in accordance with a selected operating mode. Because of the frequency and phase tracking action of the loop 25, the output of counter 29 coincides in frequency and phase with those of the horizontal sync pulses by setting the output of the VCO 28 at a frequency which is N times the frequency of the horizontal sync pulses. The output of the VCO is also applied to the divide-by-M counter 30. The scaling factor M of the counter 30 is controlled by a scaling factor command signal on bus 39 from the microcomputer 16 in accordance with the selected operating mode. Thus, the output of counter 30 is at a frequency which is N/M times the horizontal sync frequency fh. The output of counter 30 is applied to a second input of the phase detector 31 for phase comparison with the output of Exclusive-OR gate 21.

Assume that 600 pulses are generated by Exclusive-OR gate 21 per revolution of the transducer 3 for which 1,560 horizontal sync pulses must be generated and for which transmission and reception are performed at every four horizontal scan intervals. By having the microcomputer 16 set the N and M scaling factors equal to 5 and 13, respectively, the output of counter 30 and hence the horizontal sync pulse occurs at a pulse rate equal to the pulse rate of the encoder 2. Phase comparison is made one-to-one correspondence between the pulses applied to the inputs of phase comparator 31 and all the encoder pulses contribute to the generation of a phase difference signal and thus occurs approximately 1.5 times for each set of transmission and reception. Therefore, the present invention can eliminate speed variations which would otherwise occur at the instant of energy transmission and reception for all modes of operation.

The output of phase detector 41 is passed through a loop filter 32 to remove high frequency components to produce a DC signal representing a deviation of the motor speed from the reference set by the horizontal sync pulse. A speed variation detector 33 responds to variations in the speed deviation of the motor 1 due to undesired load variations by generating a speed correction signal which is applied to a motor drive circuit 37 that supplies a control current to the motor 1. Speed variation detector 33 essentially comprises a differentiator and a variable gain amplifier whose gain is set by a signal on bus 40 from the microcomputer 16 in accordance with a loop gain established by the selected operating mode. A high-frequency emphasis circuit 34 is also connected to be responsive to the speed deviation signal from the loop filter 32. This emphasis circuit accentuates the speed deviation signal from the loop filter 32 with emphasis which monotonically increases with frequency in accordance with a signal on bus 41 from microcomputer 16. This compensates for the loss of speed gain of the motor 1 as a function of frequency. The output of emphasis circuit 34 is combined with a speed setting DC voltage supplied from a digital-to-analog converter 35. This DC voltage is established with a digital signal on bus 42 to set the fundamental speed of the motor 1 for a given mode of operation. The combined voltage is adjusted by a gain control circuit 36 which is controlled by a signal on bus 43, the output of gain control circuit 36 being combined with a rapid speed variation component from detector 33 at the input of motor drive circuit 37 which drives the motor 1.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:
1. An ultrasonic imaging apparatus comprising:
   means for selecting one of a plurality of selectable modes of operation;

a probe having a rotatably mounted electroacoustic transducer for transmission of an acoustic beam and reception of acoustic echos, a motor for driving said transducer to cause said beam to be steered in a sector field and an encoder for generating pulses at intervals variable as a function of a speed of rotation of said transducer;

means (15) for generating line sync pulses;

means (11, 14) responsive to said line sync pulses for supplying ultrasonic bursts to said transducer every Kth one of said line sync pulses, where K is an integer, and receiving acoustic echos generated in said sector field;

means (12, 13) responsive to said line sync pluses for providing display of said received echos on a line-by-line raster scan field;

means (25, 30) for scaling a number of said line sync pulses generated during a predetermined period of time by a factor of N/M to produce scaled line sync pulses, so that the number of said scaled line sync pulses generated during said predetermined period of time is equal to the number of pulses generated by said encoder during said predetermined period time, where N and M are integers variable as a function of said selected mode;

phase comparator means (31, 32) for providing phase comparison between the pulses generated by said encoder and the scaled line sync pulses to generate a phase difference signal; and speed control means (33-37) responsive to said phase difference signal for controlling the speed of said motor.

2. An ultrasonic imaging apparatus as claimed in claim 1, wherein said scaling means comprises:

phase comparator means having a first input responsive to said line sync pulses and a second input;

variable frequency oscillator responsive to an output signal from said phase comparator means;

a divide-by-N counter having an input connected to an output of said oscillator and an output connected to the second input of said phase comparator means; and a divide-by-M counter connected to the output of said oscillator.

3. An ultrasonic imaging apparatus as claimed in claim 1 or 2, wherein said periodic intervals at which said ultrasonic bursts are generated are equal to an integral multiple of the intervals at which said line sync pulses are generated.

4. An ultrasonic imaging apparatus as claimed in claim 1 or 2, wherein said speed control means comprises:

a high-frequency emphasis circuit for accentuating the frequency spectrum of said phase difference signal so that the higher frequency components of the phase difference signal is emphasized with respect to the lower frequency components thereof;

means for generating a DC voltage in accordance with said selected mode;

means for detecting amplitude variations of said phase difference signal; and means for combining said accentuated phase difference signal, said DC voltage and said detected amplitude variations for controlling said motor.

5. A motor control circuit for a sector scan ultrasonic imaging apparatus having a plurality of selectable modes of operation, the apparatus including a probe having a rotatably mounted electroacoustic transducer for transmission of an acoustic beam responsive to every Kth one of said line sync pulses, where K is an integer, and reception of acoustic echos, a motor for driving said transducer to cause said beam to be steered in a sector field and an encoder for generating pulses at intervals variable as a function of a speed of rotation of said transducer, and means for providing display of received acoustic echos on a line-by-line raster scan field in response to said line sync pulses, the control circuit comprising:

means (25, 30) for scaling a number of said line sync pulses generated during a predetermined period of time by a factor of N/M to produced scaled line sync pulses, so that the number of said scaled line sync pulses generated during said predetermined period time is substantially equal to the number of pulses generated by said encoder during said predetermined period time, where N and M are integers variable as a function of a selected mode;

phase comparator means (31, 32) for providing phase comparison between the pulses generated by said encoder and the scaled line sync pulses to generate a phase difference signal; and speed control means (33-37) responsive to said phase difference signal for controlling the speed of said motor.

6. A motor speed control circuit as claimed in claim 5, wherein said scaling means comprises:

phase comparator means having a first input responsive to said line sync pulses and a second input;

variable frequency oscillator responsive to an output signal from said phase comparator means;

a divide-by-N counter having an input connected to an output of said oscillator and an output connected to the second input of said phase comparator means; and a divide-by-M counter connected to the output of said oscillator.

7. A motor control circuit as claimed in claim 5 or 6, wherein said periodic intervals at which said ultrasonic bursts are generated are equal to an integral multiple of the intervals at which said line sync pulses are generated.

8. A motor control circuit as claimed in claim 5 or 6, wherein said speed control means comprises:

a high-frequency emphasis circuit for accentuating the frequency spectrum of said phase difference signal so that the higher frequency components of the phase difference signal is emphasized with respect to the lower frequency components thereof;

means for generating a DC voltage in accordance with said selected mode;

means for detecting amplitude variations of said phase difference signal; and means for combining said accentuated phase difference signal, said DC voltage and said detected amplitude variations for controlling said motor.

* * * * *